(12) United States Patent
Gan et al.

(10) Patent No.: US 12,284,616 B2
(45) Date of Patent: *Apr. 22, 2025

(54) MULTI-LINK COMMUNICATION METHOD AND APPARATUS

(71) Applicant: HUAWEI TECHNOLOGIES CO., LTD., Guangdong (CN)

(72) Inventors: Ming Gan, Shenzhen (CN); Yifan Zhou, Shenzhen (CN); Dandan Liang, Shenzhen (CN); Guogang Huang, Shenzhen (CN); Xun Yang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/333,563

(22) Filed: Jun. 13, 2023

(65) Prior Publication Data

US 2023/0328666 A1   Oct. 12, 2023

Related U.S. Application Data

(63) Continuation of application No. 17/573,768, filed on Jan. 12, 2022, which is a continuation of application No. PCT/CN2020/101730, filed on Jul. 13, 2020.

(30) Foreign Application Priority Data

Jul. 12, 2019   (CN) .......................... 201910629773.9

(51) Int. Cl.
*H04W 56/00* (2009.01)
*H04W 76/15* (2018.01)

(52) U.S. Cl.
CPC ....... *H04W 56/0005* (2013.01); *H04W 76/15* (2018.02)

(58) Field of Classification Search
CPC .............................. H04W 56/00; H04W 76/15
See application file for complete search history.

(56) References Cited

U.S. PATENT DOCUMENTS

| | | | |
|---|---|---|---|
| 11,716,760 B2* | 8/2023 | Xin ................... | H04W 74/0816 370/329 |
| 2015/0236822 A1* | 8/2015 | Pirskanen ............. | H04L 1/1864 370/329 |

(Continued)

FOREIGN PATENT DOCUMENTS

| | | |
|---|---|---|
| CN | 105165072 A | 12/2015 |
| CN | 106576268 A | 4/2017 |

(Continued)

OTHER PUBLICATIONS

Mohand Yazid et al.,:Enhancement of the TXOP sharing designed for DL-MU-MIMO IEEE 802.11ac WLANs, Jun. 18, 2015 ,total:6 pages.

(Continued)

*Primary Examiner* — Hassan A Phillips
*Assistant Examiner* — Prenell P Jones

(57) ABSTRACT

Embodiments of this disclosure disclose a multi-link communication method and a related apparatus. In a scenario in which simultaneous transmission and reception over a plurality of links is not supported, a multi-link device first sends a first physical layer protocol data unit (PPDU) over a first link, and then sends a second PPDU over a second link through channel contention, where an end time of the second PPDU is not later than an end time of the first PPDU. The method not only ensures fairness of multi-link access, but also can reduce an idle rate of the plurality of links.

24 Claims, 6 Drawing Sheets

(56) References Cited

U.S. PATENT DOCUMENTS

| | | | |
|---|---|---|---|
| 2016/0065466 A1 | 3/2016 | Abraham et al. | |
| 2016/0100396 A1 | 4/2016 | Seok | |
| 2016/0150514 A1 | 5/2016 | Kwon et al. | |
| 2017/0332385 A1* | 11/2017 | Shirali | H04W 72/569 |
| 2018/0006866 A1 | 1/2018 | Trainin et al. | |
| 2018/0176789 A1 | 6/2018 | Fischer | |
| 2018/0317242 A1* | 11/2018 | Park | H04W 74/085 |
| 2020/0383156 A1* | 12/2020 | Seok | H04W 72/52 |
| 2021/0076412 A1* | 3/2021 | Naribole | H04W 76/15 |
| 2021/0076413 A1* | 3/2021 | Lu | H04W 76/15 |
| 2021/0127420 A1* | 4/2021 | Lu | H04W 74/0808 |
| 2021/0282186 A1* | 9/2021 | Cherian | H04W 74/006 |
| 2021/0337475 A1 | 10/2021 | Cariou et al. | |
| 2021/0378039 A1* | 12/2021 | Cherian | H04W 8/24 |
| 2022/0053560 A1* | 2/2022 | Xin | H04W 28/0268 |
| 2022/0141785 A1* | 5/2022 | Gan | H04W 76/15 370/350 |
| 2022/0150958 A1* | 5/2022 | Chu | H04W 74/0866 |
| 2022/0167444 A1* | 5/2022 | Jang | H04W 76/15 |
| 2022/0174691 A1* | 6/2022 | Xia | H04W 74/0816 |
| 2022/0174732 A1* | 6/2022 | Xia | H04L 5/0037 |
| 2022/0210829 A1* | 6/2022 | Kim | H04W 4/46 |
| 2022/0225406 A1 | 7/2022 | Kim et al. | |
| 2022/0279375 A1* | 9/2022 | Kim | H04W 74/00 |
| 2022/0303356 A1 | 9/2022 | Cariou et al. | |
| 2022/0303907 A1* | 9/2022 | Shafin | H04W 76/15 |
| 2022/0345973 A1* | 10/2022 | Sun | H04W 74/0816 |
| 2023/0057502 A1* | 2/2023 | Nayak | H04W 74/08 |
| 2023/0123499 A1* | 4/2023 | Chang | H04W 74/08 370/392 |
| 2023/0140556 A1* | 5/2023 | Ko | H04L 5/0055 370/329 |
| 2023/0156795 A1* | 5/2023 | Hwang | H04W 74/0816 370/329 |
| 2023/0199847 A1* | 6/2023 | Xin | H04W 72/512 370/329 |
| 2023/0217494 A1* | 7/2023 | Li | H04W 56/00 370/350 |
| 2023/0276516 A1* | 8/2023 | Shirakawa | H04W 76/15 370/329 |
| 2023/0403743 A1 | 12/2023 | Kim | |
| 2023/0422188 A1* | 12/2023 | Fischer | H04L 1/1671 |

FOREIGN PATENT DOCUMENTS

| | | |
|---|---|---|
| CN | 106941731 A | 7/2017 |
| CN | 107113833 A | 8/2017 |
| CN | 107771376 A | 3/2018 |
| WO | 2016206608 A1 | 12/2016 |
| WO | 2018084034 A1 | 5/2018 |
| WO | 2018195903 A1 | 11/2018 |

OTHER PUBLICATIONS

Yunbo Li (Huawei): "channel access in multi-band operation",IEEE Draft; 11-19-1116-00-00BE-Channel-Access-in-Mul Tiband-Operation, IEEE-SA Mentor, Piscataway, NJ USA, vol. 802.11 EHT; 802.11 be Jul. 10, 2019 (Jul. 10, 2019), pp. 1-16,XP068152826,Retrieved from the Internet:URL:https://mentor.ieee.org/802.11 /dcn/19/11-19-1116-00-00bechannel-access-in-multi-band-operation.pptx[retrieved on Jul. 10, 2019].

Lei Huang (Panasonic), Enabling persistent allocation for EHT, IEEE802.11-19/0806r0, IEEE, Internet URL:https://mentor.ieee.org/802.11/dcn/19/11-19-0806-00-00be-enabling-persistent-allocation-for-eht.pptx>, May 12, 2019, total:7pages.

IEEE Std 802.11n-2009,Part 11:Wireless LAN Medium Access Control (MAC) and Physical Layer (PHY) Specifications,Amendment 5:Enhancements for Higher Throughput,dated Sep. 11, 2009,total 536 pages.

Yongho Seok (MediaTek), Multi-link Operation, IEEE 802.11-19/0731r0, IEEE, Internet URL:https://mentor.ieee.org/802.11/dcn/19/11-19-0731-00-00be-multi-link-operation.pptx>, May 15, 2019,total:17pages.

IEEE Std 802.11ac-2013,IEEE Computer Society,Part 11:Wi re}ess LAN M ed i u m Access Control(MAC) and Physical Layer(PHY) Specifications,Amendment 4:Enhancements for Very High Throughput for Operation in Bands below 6 GHz,dated 2013,total 425 pages.

IEEE Std 802.11g-2003 (Amendment to IEEE Std 802.11 , 1999 Edition (Reaff 2003), IEEE Standard for Information technology Telecommunications and information exchange between systems Local and metropolitan area networks Specific requirementsPart 11: Wireless LAN Medium Access Control (MAC) and Physical Layer (PHY) specifications Amendment 4: Further Higher Data Rate Extension in the 2.4 GHz Band,Jun. 27, 2003,total 78 pages.

"IEEE P802.11ax /D3.0, Draft Standard for Information technology Telecommunications and information exchange between systems Local and metropolitan area networks Specific requirements Part 11: Wireless LAN Medium Access Control (MAC) and Physical Layer (PHY) Specifications Amendment 6: Enhancements for High Efficiency WLAN. Jun. 2018, 682 pages".

Abhishek Patil et al:"Multi-Link Operation: Design Discussion". May 2019, IEEE 802.11-19/0823r0, total 11 pages.

* cited by examiner

1

MULTI-LINK COMMUNICATION METHOD AND APPARATUS

CROSS-REFERENCE TO RELATED APPLICATIONS

This application is a continuation of U.S. patent application Ser. No. 17/573,768, filed on Jan. 12, 2022, which is a continuation of International Application No. PCT/CN2020/101730, filed on Jul. 13, 2020, which claims priority to Chinese Patent Application No. 201910629773.9, filed on Jul. 12, 2019. All of the afore-mentioned patent applications are hereby incorporated by reference in their entireties.

TECHNICAL FIELD

This disclosure relates to the field of communications technologies, and in particular, to a multi-link communication method and apparatus and a system.

BACKGROUND

To greatly increase a service transmission rate of a wireless local area network (wireless local area network) system, an orthogonal frequency division multiple access (orthogonal frequency division multiple access) technology is further used in the Institute of Electrical and Electronics Engineers (Institute of Electrical and Electronics Engineers) 802.11ax standard based on an existing orthogonal frequency division multiplexing (orthogonal frequency division multiplexing) technology. The OFDMA technology supports a plurality of nodes in sending and receiving data simultaneously. This achieves multi-station diversity gains. In addition, as unlicensed frequency bands 5925 MHz to 7125 MHz (the frequency bands are referred to as 6 GHz frequency bands) are further developed, operating frequency bands of the WLAN system are extended from 2.4 GHz and 5 GHz to 2.4 GHz, 5 GHz, and 6 GHz.

A device that can operate in a plurality of frequency bands is referred to as a multi-link device or a multi-band device. A multi-link device can support multi-link communication. For example, the multi-link device supports simultaneous communication in frequency bands 2.4 GHz, 5 GHz, and 6 GHz. Even if a quantity of antennas is limited, the multi-link device can be handed over between different frequency bands to select an optimal frequency band, thereby ensuring communication quality of the multi-link device. However, how to ensure communication fairness of a multi-link device operating over a plurality of links, reduce an idle rate of the links, and improve communication efficiency is critical in a system supporting multi-link communication.

SUMMARY

Embodiments of this disclosure provide a multi-link communication method and apparatus and a system, to ensure communication fairness of a multi-link device operating over a plurality of links, reduce an idle rate of the links, and improve communication efficiency.

According to a first aspect, a multi-link communication method is provided. The multi-link communication method is applied to a multi-link device. The multi-link device operates over a plurality of links, the plurality of links include a first link and a second link, and the multi-link device does not support simultaneous transmission and reception of PPDUs over the first link and the second link. The method includes: The multi-link device sends a first physical layer protocol data unit (PPDU) over the first link. The multi-link device sends a second PPDU over the second link through channel contention. An end time of the second PPDU is not later than an end time of the first PPDU. For example, the end time of the second PPDU is the same as the end time of the first PPDU. Optionally, a start moment of the second PPDU is not earlier than a start moment of the first PPDU. To be specific, the start moment of the second PPDU is later than or equal to the start moment of the first PPDU. The multi-link device first sends the PPDU over the first link, and then sends the PPDU after separately performing channel contention over the second link. The multi-link device independently performs channel contention over the plurality of links. A message packet is sent earlier over a link over which a channel is preempted earlier through contention, and a message packet is sent later over a link over which a channel is preempted later through contention. This not only can ensure fairness of multi-link access, but also can reduce an idle rate of the plurality of links and improve frequency efficiency.

That the multi-link device does not support simultaneous transmission and reception over the first link and the second link includes: The multi-link device does not support sending a physical layer protocol data unit of a first bandwidth over the first link and receiving a physical layer protocol data unit of a second bandwidth over the second link at the same time; and/or the multi-link device does not support receiving the physical layer protocol data unit of the first bandwidth over the first link and sending the physical layer protocol data unit of the second bandwidth over the second link at the same time. "At the same time" means that there is an intersection that is not empty between the PPDU of the first bandwidth and the PPDU of the second bandwidth in terms of time.

In an optional design, the first PPDU includes an uplink-downlink indication, the uplink-downlink indication is used to indicate a transmission direction of the first PPDU, and the transmission direction includes uplink or downlink. Another device may determine, based on the uplink-downlink indication, a type of the multi-link device that sends the first PPDU. Optionally, if the transmission direction of the first PPDU is uplink, the multi-link device that sends the first PPDU is a multi-link station; and if the transmission direction of the first PPDU is downlink, the multi-link device that sends the first PPDU is a multi-link access point.

In an optional design, the first PPDU includes first TXOP duration information, and the first TXOP duration information indicates first TXOP duration; the second PPDU includes second TXOP duration information, and the second TXOP duration information indicates second TXOP duration; and the first TXOP duration is the same as the second TXOP duration. In other words, a second TXOP indicated in the second PPDU may be set based on a first TXOP indicated in the first PPDU. The first TXOP duration information is carried in a physical layer preamble of the first PPDU or a duration field in a MAC header of the first PPDU. The second TXOP duration information is carried in a physical layer preamble of the second PPDU or a duration field in a MAC header of the second PPDU.

According to a second aspect, another multi-link communication method is provided. The multi-link communication method is applied to a multi-link device. The multi-link device operates over a plurality of links, the plurality of links include a first link and a second link, and the multi-link device does not support simultaneous transmission and reception of PPDUs over the first link and the second link. The method includes: A first multi-link device sends a first physical layer protocol data unit (PPDU) over the first link. The first multi-link device receives, over the first link after a preset time interval, a second PPDU that is sent by a second device in response to the first PPDU. The first multi-link device receives, over the second link, a third PPDU sent by a third multi-link device over the second link. An end time of the third PPDU is not later than an end time of the second PPDU, and "not later than" includes "earlier than or equal to". Optionally, a start moment of the third PPDU is not earlier than an end time of the first PPDU, and "not earlier than" includes "later than or equal to". Optionally, the first multi-link device and the third multi-link device belong to a same basic service set (BSS). According to the foregoing method, when receiving the PPDU sent by the first multi-link device over the first link, another multi-link device may start to perform channel preemption (including actions such as listening and backoff) over another link at the end time of the PPDU, to send a PPDU. This not only can ensure fairness of multi-link access, but also can reduce an idle rate of the plurality of links and improve frequency efficiency.

That the multi-link device does not support simultaneous transmission and reception over the first link and the second link includes: The multi-link device does not support sending a physical layer protocol data unit of a first bandwidth over the first link and receiving a physical layer protocol data unit of a second bandwidth over the second link at the same time; and/or the multi-link device does not support receiving the physical layer protocol data unit of the first bandwidth over the first link and sending the physical layer protocol data unit of the second bandwidth over the second link at the same time. "At the same time" means that there is an intersection that is not empty between the PPDU of the first bandwidth and the PPDU of the second bandwidth in terms of time.

In an optional design, the first PPDU includes transmission duration information, and the transmission duration information is used to indicate transmission duration of the second PPDU; or a physical layer preamble of the second PPDU includes the transmission duration information, and the transmission duration information is used to indicate the transmission duration of the second PPDU. The third multi-link device may obtain the transmission duration of the second PPDU based on the transmission duration information, to determine transmission duration and the end time of the third PPDU based on the transmission duration of the second PPDU, so as to prevent the first multi-link device from simultaneously performing transmission and reception over the first link and the second link.

In an optional design, the third PPDU includes third TXOP duration information indicating third TXOP duration, and the third TXOP duration does not exceed a smaller time value or an earlier end time value of first TXOP duration indicated by first TXOP duration information in the first PPDU and second duration; and the second duration is the transmission duration of the second PPDU or a sum of the transmission duration of the second PPDU, a SIFS, and transmission duration of acknowledgment information in response to the second PPDU.

In an optional design, the first PPDU includes data information, and the second PPDU includes acknowledgment information, or the first PPDU includes trigger information, and the second PPDU includes uplink data. Certainly, the first PPDU may further include other information.

According to a third aspect, another multi-link communication method is provided. The multi-link communication method is applied to a multi-link device. The multi-link device operates over a plurality of links, and the plurality of links include a first link and a second link. The method includes: A third multi-link device obtains a first PPDU transmitted by a first multi-link device over the first link. The third multi-link device sends a third PPDU over the second link at or after an end time of the first PPDU. An end time of the third PPDU is not later than an end time of a second PPDU, and the second PPDU is sent over the first link in response to the first PPDU. "Not later than" includes "earlier than or equal to". The second PPDU is in response to the first PPDU sent by the first multi-link device over the first link. A start moment of the third PPDU is not earlier than the end time of the first PPDU, and "not earlier than" includes "later than or equal to". Optionally, the third multi-link device may send the third PPDU through channel contention. The first multi-link device and the third multi-link device belong to a same basic service set (BSS).

According to the foregoing method, when receiving the PPDU sent by the first multi-link device over the first link, another multi-link device may start to perform channel preemption (including actions such as listening and backoff) over another link at the end time of the PPDU, to send a PPDU. This not only can ensure fairness of multi-link access, but also can reduce an idle rate of the plurality of links and improve frequency efficiency.

In an optional design, the sending the third PPDU over the second link through channel contention includes: The third multi-link device sends the third PPDU over the second link through channel contention at or after the end time of the first PPDU.

In an optional design, the first PPDU includes transmission duration information, and the transmission duration information is used to indicate transmission duration of the second PPDU; or a physical layer preamble of the second PPDU includes the transmission duration information, and the transmission duration information is used to indicate the transmission duration of the second PPDU. The third multi-link device may obtain the transmission duration of the second PPDU based on the transmission duration information, to determine transmission duration and the end time of the third PPDU based on the transmission duration of the second PPDU, so as to prevent the first multi-link device from simultaneously performing transmission and reception over the first link and the second link.

In an optional design, the third PPDU includes third TXOP duration information indicating third TXOP duration, and the third TXOP duration does not exceed a smaller time value or an earlier end time value of first TXOP duration indicated by first TXOP duration information in the first PPDU and second duration; and the second duration is the transmission duration of the second PPDU or a sum of the transmission duration of the second PPDU, a SIFS, and transmission duration of acknowledgment information in response to the second PPDU.

In an optional design, the first PPDU includes data information, and the second PPDU includes acknowledgment information, or the first PPDU includes trigger information, and the second PPDU includes uplink data. Certainly, the first PPDU may further include other information.

According to a fourth aspect, a multi-link communication apparatus is provided. The multi-link communication apparatus operates over a plurality of links, and the plurality of links include a first link and a second link. The apparatus includes: a first sending module, configured to send a first physical layer protocol data unit (PPDU) over the first link; and a second sending module, configured to send a second PPDU over the second link through channel contention, where an end time of the second PPDU is not later than an end time of the first PPDU. For example, the end time of the second PPDU is the same as the end time of the first PPDU. Optionally, a start moment of the second PPDU is not earlier than a start moment of the first PPDU. To be specific, the start moment of the second PPDU is later than or equal to the start moment of the first PPDU. The multi-link device first sends the PPDU over the first link, and then sends the PPDU after separately performing channel contention over the second link. The multi-link device independently performs channel contention over the plurality of links. A message packet is sent earlier over a link over which a channel is preempted earlier through contention, and a message packet is sent later over a link over which a channel is preempted later through contention. This not only can ensure fairness of multi-link access, but also can reduce an idle rate of the plurality of links and improve frequency efficiency.

In an optional design, the apparatus further includes a first processing module and a second processing module. The first processing module is configured to generate the first PPDU, and the second processing module is configured to generate the second PPDU. The first processing module and the second processing module may alternatively be one processing module.

According to a fifth aspect, a multi-link communication apparatus is provided. The multi-link communication apparatus operates over a plurality of links, and the plurality of links include a first link and a second link. The apparatus includes:
 a first transceiver module, configured to send a first physical layer protocol data unit (PPDU) over the first link, where
 the first transceiver module is configured to receive, by the first multi-link device over the first link after a preset time interval, a second PPDU that is sent by a second device in response to the first PPDU; and
 a second transceiver module, configured to receive, over the second link, a third PPDU sent by a third multi-link device over the second link, where an end time of the third PPDU is not later than an end time of the second PPDU.

In an optional design, the first transceiver module further includes a first sending module and a first receiving module. The second transceiver module further includes a second sending module and a second receiving module. One transceiver module may support the multi-link communication apparatus in operating over one link.

According to a sixth aspect, a multi-link communication apparatus is provided. The apparatus includes:
 a first transceiver module, configured to obtain a first PPDU transmitted by a first multi-link device over a first link; and
 a second transceiver module, configured to send a third PPDU over a second link, where an end time of the third PPDU is not later than an end time of a second PPDU, and the second PPDU is sent over the first link in response to the first PPDU.

In an optional design, the first transceiver module further includes a first sending module and a first receiving module. The second transceiver module further includes a second sending module and a second receiving module. One transceiver module may support the multi-link communication apparatus in operating over one link.

With reference to the fifth aspect or the sixth aspect, in an optional implementation, the end time of the third PPDU is not later than the end time of the second PPDU, and "not later than" includes "earlier than or equal to". Optionally, a start time of the third PPDU is not earlier than an end time of the first PPDU, and "not earlier than" includes "later than or equal to". Optionally, the first multi-link device and the third multi-link device belong to a same basic service set (BSS). The end time may also be referred to as an end moment, and the start time may also be referred to as a start moment.

According to a seventh aspect, a multi-link communication apparatus is provided. The multi-link communication apparatus includes a processor and a memory. The memory is configured to store computer instructions, and when the processor executes the instructions, the communication apparatus is enabled to perform the method according to any one of the foregoing aspects. The communication apparatus may be the multi-link device in the first aspect or a chip in the multi-link device in the first aspect, may be the first multi-link device in the second aspect or a chip in the first multi-link device in the second aspect, or may be the multi-link device in the third aspect or a chip in the multi-link device in the third aspect.

According to an eighth aspect, a communication apparatus is provided. The communication apparatus includes a processor. The processor is configured to: after being coupled to a memory and reading instructions in the memory, perform, according to the instructions, the method according to any one of the foregoing aspects. The communication apparatus may be the multi-link device in the first aspect or a chip in the multi-link device in the first aspect, may be the first multi-link device in the second aspect or a chip in the first multi-link device in the second aspect, or may be the multi-link device in the third aspect or a chip in the multi-link device in the third aspect.

According to a ninth aspect, a computer-readable storage medium is provided, where the computer-readable storage medium stores instructions; and when the instructions are run on a computer, the computer is enabled to perform the method in any one of the foregoing aspects.

According to a tenth aspect, a computer program product including instructions is provided, where when the computer program product is run on a computer, the computer is enabled to perform the method in any one of the foregoing aspects.

DESCRIPTION OF EMBODIMENTS

The following describes the embodiments of this disclosure with reference to the accompanying drawings in the embodiments of this disclosure. The network architecture and the service scenario described in the embodiments of this disclosure are intended to describe the technical solutions in the embodiments of this disclosure more clearly, and do not constitute a limitation on the technical solutions provided in the embodiments of this disclosure. A person of ordinary skill in the art may learn that: With evolution of the network architecture and emergence of a new service scenario, the technical solutions provided in the embodiments of this disclosure are also applicable to similar technical problems.

The solutions in the embodiments of this disclosure are applicable to communication between at least two multi-link devices. A multi-link device is a device that can operate over a plurality of links. The plurality of links are a plurality of links that are different in frequency domain. The plurality of links may be different channels in a plurality of different frequency bands, or the plurality of links may be different channels in a same frequency band. Optionally, in a WLAN system, frequency bands may include 2.4 GHz, 5 GHz, 6 GHz, and the like. A channel bandwidth in a frequency band may be 20 MHz, 40 MHz, 80 MHz, 160 MHz, 320 MHz, or the like, and a basic unit is 20 MHz. Subsequently, the channel bandwidth may be further extended, and the basic unit may alternatively be 40 MHz or higher.

Figure 1:
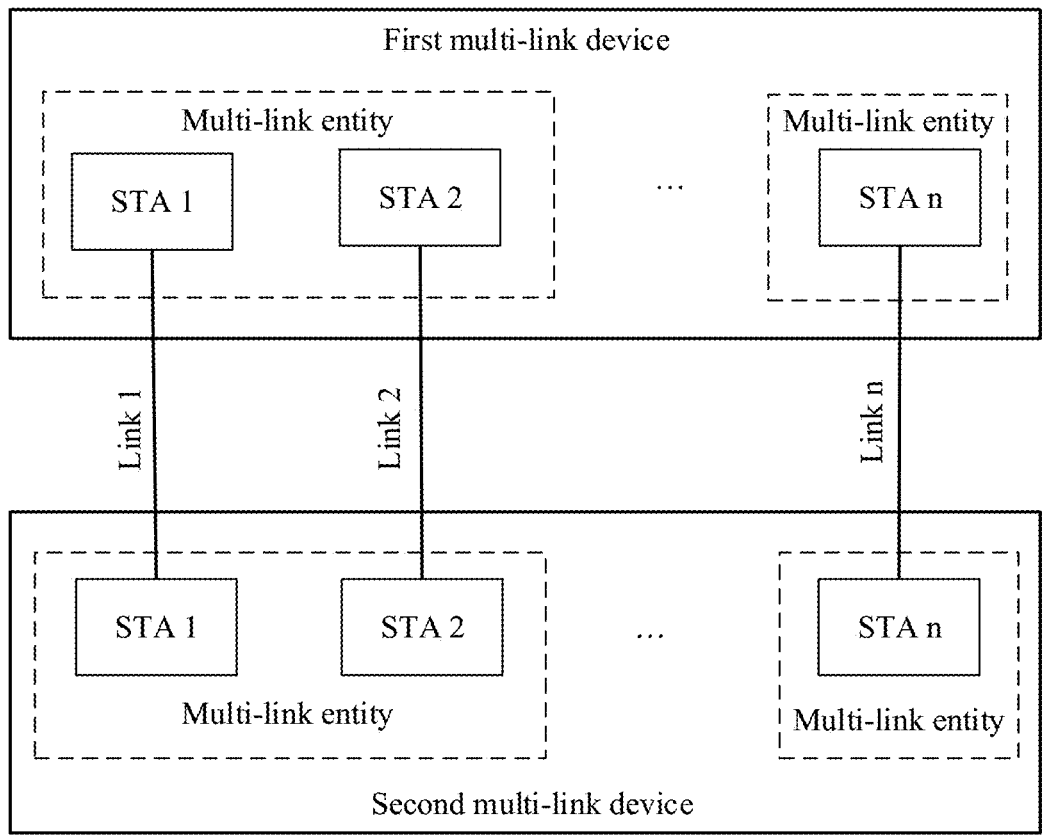
FIG. 1 is a schematic diagram of a multi-link communication scenario.

The multi-link device includes a plurality of stations (station, STA). One station corresponds to one link and operates over the corresponding link. The station may be a non-access point station (non-AP station) or an access point station (AP station). FIG. 1 shows an example of a communication scenario according to an embodiment of this disclosure. As shown in FIG. 1, the communication system includes a first multi-link device and a second multi-link device. The multi-link devices each include a plurality of stations (for example, a STA 1, a STA 2, . . . , and a STA n), and the plurality of STAs operate over a plurality of links (for example, a link 1, a link 2, . . . , and a link n). One station operates over one link. The plurality of stations may also belong to one multi-link entity, and the plurality of stations in the multi-link entity share one media access control (media access control) service access point (service access point). It can be understood that a quantity of multi-link devices, a quantity of stations in a multi-link device, and a quantity of links that are included in the communication scenario shown in FIG. 1 are merely used as an example, and do not constitute any limitation on this disclosure.

In an example, the multi-link device is a multi-link access point and includes a plurality of access point (AP) stations, and one access point corresponds to one link and operates over the corresponding link. In another example, the multi-link device is a multi-link station and includes a plurality of non-access point stations, and one non-access point station corresponds to one link and operates over the corresponding link. In another example, the multi-link device may include both an access point station and a non-access point station. Therefore, the solutions in the embodiments of this disclosure not only can be applied to communication between one multi-link access point and one multi-link station, but also can be applied to communication between at least two multi-link access points and communication between at least two multi-link stations. Certainly, the solutions can also be applied to communication between multi-link devices each including both an access point station and a non-access point station.

An access point (AP) included in the multi-link device may be a communication apparatus having a wireless communication function, provides a service for a non-access point station, and supports a mobile subscriber in accessing a wired network. The AP may be deployed inside a home, a building, or a campus. A typical coverage radius of the AP is tens of meters to approximately a hundred meters. Certainly, the AP may alternatively be deployed outdoors. The AP is equivalent to a bridge that connects the wired network and a wireless network. A main function of the AP is to connect wireless stations together, and then connect the wireless network to the Ethernet. The AP can support a plurality of communications protocols, for example, a cellular communications protocol and a WLAN communications protocol. Optionally, the AP may be a device with a wireless fidelity (Wi-Fi) chip, and can support a WLAN communications protocol. For example, the AP can support a next generation of 802.11ax. Optionally, the multi-link AP can also support 802.11ax, 802.11ac, 802.11n, 802.11g, 802.11b, 802.11a, and the like.

A station included in the multi-link device may be a communication apparatus having a wireless communication function, and can support a plurality of communications protocols, for example, a cellular communications protocol and a WLAN communications protocol. Optionally, the STA may be a device with a wireless fidelity (Wi-Fi) chip, and can support a WLAN communications protocol. For example, the multi-link STA can support a next generation of 802.11ax. Optionally, the STA can also support a plurality of WLAN standards such as 802.11ax, 802.11ac, 802.11n, 802.11g, 802.11b, and 802.11a. The STA may alternatively be a terminal device, for example, a mobile phone supporting a Wi-Fi communication function, a tablet computer supporting a Wi-Fi communication function, a set-top box supporting a Wi-Fi communication function, a smart television supporting a Wi-Fi communication function, a smart wearable device supporting a Wi-Fi communication function, a vehicle-mounted communication device supporting a Wi-Fi communication function, or a computer supporting a Wi-Fi communication function.

For a multi-link device that operates on a plurality of links, the multi-link device usually cannot support simultaneous transmission and reception over the plurality of links because there is energy leakage between the links and the multi-link device has an insufficient capability of simultaneously performing transmission and reception. Even if the multi-link device is allowed to simultaneously perform transmission and reception over the plurality of links, a data packet sent over one link causes interference to a data packet received over another link, causing relatively low communication quality. Therefore, for a case in which a multi-link device cannot simultaneously perform transmission and reception over two or more links, a plurality of solutions are proposed.

Figure 2:
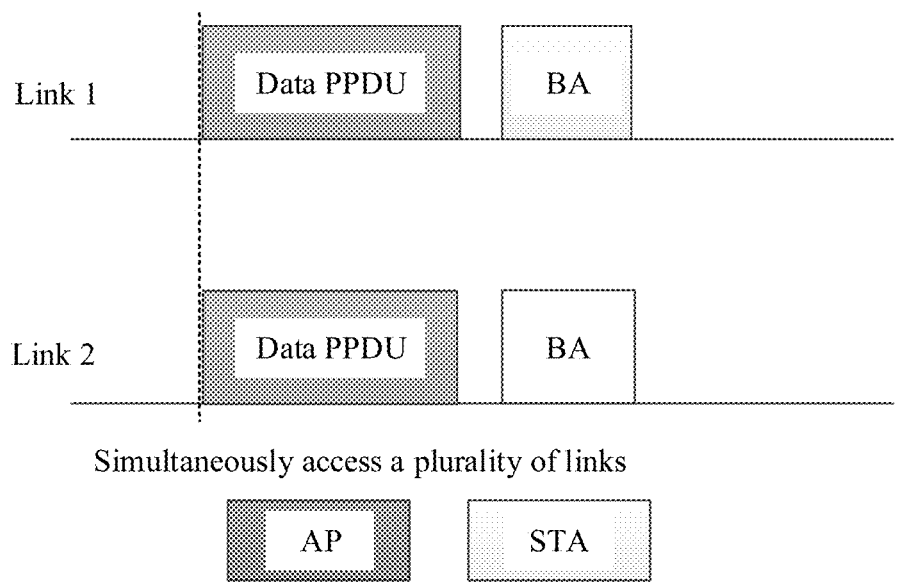
FIG. 2 is a schematic diagram of a time sequence of a multi-link communication method for synchronously accessing a plurality of links according to an embodiment of this disclosure.

One solution is a synchronous sending method. A main principle thereof is as follows: Channel contention is independently performed over a plurality of links to simultaneously access channels, and duration for sending data packets over the plurality of links is the same (if necessary, this case can be implemented by padding a useless information bit). An implementation of simultaneously accessing channels includes: When the multi-link device backs off to 0, that is, preempts a transmission opportunity, over one link through channel contention, for example, enhanced distributed channel access (EDCA), the multi-link device detects whether another link is idle for a point coordination function interframe space (PIFS) time prior to start of transmission over the link. If the another link is idle for the PIFS time, the multi-link device simultaneously performs sending over a plurality of links. If the another link is busy for the PIFS time, the multi-link device may select a single link to perform sending or may not perform sending. As shown in FIG. 2, an AP backs off to 0 over a link 1 through EDCA-based channel contention, and then detects whether a link 2 is idle for a PIFS time prior to start of transmission over the link 1. If the link 2 is idle for the PIFS time, the AP sends physical layer protocol data units (PPDUs) over the two links, where transmission duration of the PPDUs sent over the two links is the same. Then, after a fixed interval, for example, a SIFS (short interframe space) defined in 802.11, the multi-link device receives, over the two links, acknowledgment frames returned from a station. In FIG. 2, a block acknowledgment (BA) is used as an example. Certainly, an acknowledgment (ACK) frame may alternatively be used as an example. According to the synchronous sending method, a problem that simultaneous transmission and reception cannot be performed over a plurality of links can be avoided. However, in this solution, the multi-link device first performs channel contention over one link, and then sends a data packet over another link that is idle for a PIFS time prior to start of transmission over the link. However, no conventional listening and backoff are performed over the another link. Instead, whether the another link is busy for the PIFS prior to start of transmission over the link is detected. As a result, a station in the multi-link device can preferentially access a channel over the another link, and this is unfair to another station.

Figure 3:
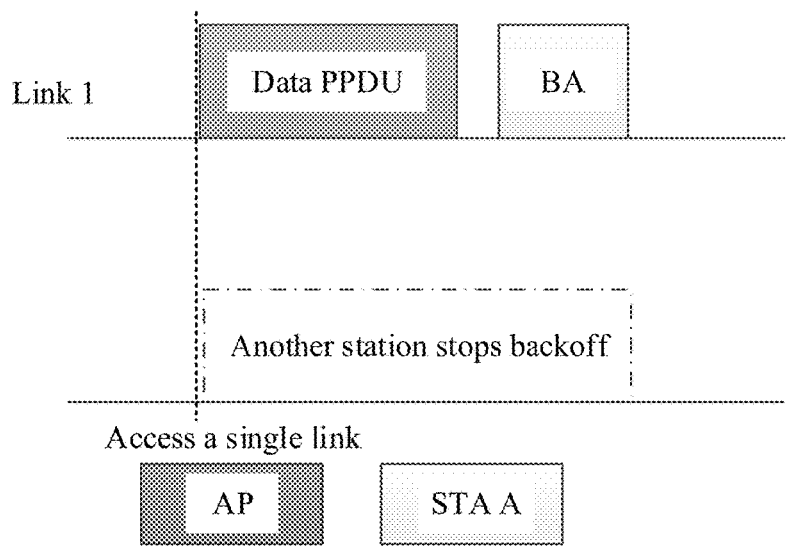
FIG. 3 is a schematic diagram of a time sequence of a single-link communication method for accessing a single link according to an embodiment of this disclosure.

Another solution is prohibiting simultaneous transmission and reception. A station in the multi-link device sends a data packet over only one link. To avoid simultaneous transmission and reception, the multi-link device needs to prohibit a data packet receive end and a multi-link device to which another station belongs and that is in a current basic service set (BSS) from sending data over another link through channel contention, that is, enable the data packet receive end and the multi-link device to which the another station belongs to stop backoff. There are a plurality of scenarios in which the multi-link device performs sending over one link. For example, the multi-link device sends data over only one link. For another example, the multi-link device first performs channel contention over one link, but in this case, other links are busy. As shown in FIG. 3, an AP in the multi-link device preempts a channel over a link 1 through contention, and sends a physical layer protocol data unit (PPDU) to a station A. If the station A is a multi-link station, when the station A is receiving a data packet sent by the AP, the station A needs to stop backoff that is being performed by the station A over another link, and starts to perform backoff only after an end time of the data unit or after a total time of a transmission time of the data unit, a SIFS, and a longest transmission time of an acknowledgment message frame. Similarly, if the multi-link device in the current BSS learns, by listening, that the AP sends the data packet over the link 1, the multi-link device also needs to stop backoff over the another link. According to the method for prohibiting simultaneous transmission and reception, backoff performed by the multi-link station in the current BSS over a link over which no data packet is received needs to be stopped. This prevents the station from simultaneously performing transmission and reception, but an idle link spectrum resource is wasted.

Therefore, the embodiments of this disclosure provide a multi-link communication method, to ensure fairness of multi-link access, reduce an idle rate of a plurality of links, and improve frequency efficiency in a scenario in which simultaneous transmission and reception over a plurality of links is not supported.

Embodiment 1

In a scenario in which simultaneous transmission and reception over a plurality of links is not supported, a multi-link station independently performs channel contention over the plurality of links, a PPDU is sent earlier over a link over which a channel is preempted earlier, and a PPDU is sent later over a link over which a channel is preempted later. However, in this case, an end time of the PPDU sent later needs to be not later than an end time of the PPDU sent earlier. For example, the end time of the PPDU sent later is the same as the end time of the PPDU sent earlier. In other words, a start time of the PPDU sent later does not need to be the same as a start time of the PPDU sent earlier but the end time of the PPDU sent later is the same as the end time of the PPDU sent earlier. In this disclosure, the end time may also be referred to as an end moment or an end time point, and the start time may also be referred to as a start moment or a start time point.

This embodiment of this disclosure provides a multi-link communication method. The method may be applied to a multi-link device, and the method includes the following steps.

S101. The multi-link device sends a first physical layer protocol data unit (PPDU) over a first link.

The multi-link device may operate over at least two links, the at least two links include the first link and a second link, and the multi-link device does not support simultaneous transmission and reception of PPDUs over the first link and the second link. The first PPDU may be sent by a station that is in the multi-link device and that operates over the first link. In an example, that the multi-link device does not support simultaneous transmission and reception of PPDUs over the first link and the second link includes: The multi-link device does not support sending a physical layer protocol data unit of a first bandwidth over the first link and receiving a physical layer protocol data unit of a second bandwidth over the second link at the same time; and/or the multi-link device does not support receiving the physical layer protocol data unit of the first bandwidth over the first link and sending the physical layer protocol data unit of the second bandwidth over the second link at the same time. "At the same time" means that there is an intersection that is not empty between the PPDU of the first bandwidth and the PPDU of the second bandwidth in terms of time. Optionally, the first bandwidth and the second bandwidth each include but are not limited to one of 20 MHz, 40 MHz, 80 MHz, 160 MHz, and 320 MHz.

In addition, "simultaneous transmission and reception" in this disclosure does not mean that there is no difference in time, and "simultaneous transmission and reception" may mean that there is an intersection that is not empty between a transmission time of the PPDU of the first bandwidth sent over the first link and a transmission time of the PPDU of the second bandwidth sent over the second link. For example, if duration of the PPDU of the first bandwidth is T1=E1–S1, a start time to an end time is [S1, E1], duration of the PPDU of the second bandwidth is T2=E2–S2, and a start time to an end time is [S2, E2], there is an intersection that is not empty between [S1, E1] and [S2, E2].

Optionally, the multi-link device may send the first PPDU over the first link through channel contention. A manner of channel contention may be EDCA or multi-user EDCA (multi-user EDCA, MU EDCA) specified in the 802.11 protocol, a conventional channel contention manner, or the like. In an example, the EDCA-based contention manner includes: The multi-link device first performs listening for an AIFS time, then starts backoff, and then starts to send data when backing off to 0; in the backoff process, if a channel is busy, the backoff is suspended or stopped; and when the channel is idle next time, channel contention is performed again based on the backoff suspended last time, or in other words, the EDCA-based contention manner includes processes such as performing listening for the AIFS time and backoff. Optionally, the multi-link device may have pre-empted a channel over the first link, and send the first PPDU over the first link in a preempted transmission opportunity (TXOP). The first PPDU is a data packet in the TXOP. Optionally, the first PPDU may include a data frame, a management frame, a control frame, or the like, or may be an aggregated packet of a plurality of types of frames.

S102. The multi-link device sends a second PPDU over the second link through channel contention, where an end time of the second PPDU is not later than an end time of the first PPDU.

The multi-link device performs channel contention over the second link, and sends the second PPDU over the second link after preempting a channel through contention. A sending time of the second PPDU is not earlier than (is equal to or later than) a sending time of the first PPDU, and the second PPDU may be sent by a station that is in the multi-link device and that operates over the second link. A manner of channel contention performed by the multi-link device over the second link may also be EDCA or multi-user EDCA (MU EDCA) specified in the 802.11 protocol, a conventional channel contention manner, or the like. Optionally, the second PPDU may include a data frame, a management frame, a control frame, or the like, or may be an aggregated packet of a plurality of types of frames. Optionally, the multi-link device may send the second PPDU in one TXOP without performing channel contention.

In an implementation, that the end time of the second PPDU is not later than the end time of the first PPDU includes: The end time of the second PPDU is the same as the end time of the first PPDU. Because the first PPDU is aligned with the second PPDU, a case in which the multi-link device may perform simultaneous transmission and reception is avoided. It should be noted that, because the multi-link device learns of duration of the first PPDU, when sending the second PPDU, the multi-link device may accurately determine duration of the second PPDU based on the duration of the first PPDU, so that the end time of the second PPDU is not later than the end time of the first PPDU. In another manner, the multi-link device may alternatively learn of transmission duration of the first PPDU by listening to a length field in an L-SIG field of a legacy preamble of the first PPDU that is sent earlier.

Optionally, a TXOP length indicated in the second PPDU may be set to be the same as TXOP duration indicated in the first PPDU, where information indicating the TXOP duration may be located in a physical layer preamble of the PPDU, or may be located in a duration field in a MAC header of the PPDU. Therefore, in an implementation, the first PPDU includes first TXOP duration information, and the first TXOP duration information indicates first TXOP duration; the second PPDU includes second TXOP duration information, and the second TXOP duration information indicates second TXOP duration; and the first TXOP duration is the same as the second TXOP duration. The first TXOP duration information is carried in a physical layer preamble of the first PPDU or a duration field in a MAC header of the first PPDU. The second TXOP duration information is carried in a physical layer preamble of the second PPDU or a duration field in a MAC header of the second PPDU.

Before step S101 and step S102 are performed, when a station is associated with an AP or listens to a beacon frame sent by an AP, the station may obtain capability information of the multi-link AP, to learn of specific links between which the multi-link AP cannot support simultaneous transmission and reception and specific links between which the multi-link AP can support simultaneous transmission and reception. Further, the station learns of specific links between which the multi-link AP cannot simultaneously perform transmission and reception of the PPDU of the first bandwidth and the PPDU of the second bandwidth. The bandwidths of the PPDUs are a factor that determines self-interference of the plurality of links. The capability information may be implicit indication information, or may be explicit indication information. A specific method for indicating the capability information is not specifically limited in this embodiment of this disclosure.

Optionally, the method further includes the following steps.

S103. The multi-link device receives, over the first link, first acknowledgment information in response to the first PPDU.

S104. The multi-link device receives, over the second link, second acknowledgment information in response to the second PPDU.

The first acknowledgment information is sent by a destination receive end of the first PPDU, and the second acknowledgment information is sent by a destination receive end of the second PPDU. The destination receive ends of the first PPDU and the second PPDU may be multi-link devices, or may not be multi-link devices but may be devices operating over the links, for example, APs or non-AP STAs. The destination receive end of the first PPDU and a first multi-link device may be located in a same basic service set (BSS), and the destination receive end of the second PPDU and the first multi-link device are located in a same BSS. Optionally, the destination receive end of the first PPDU and the destination receive end of the second PPDU may be a same destination receive end, or may be different destination receive ends. When the destination receive end of the first PPDU and the destination receive end of the second PPDU are a same destination receive end, the receive end is a multi-link device. This is not limited in this disclosure. Optionally, the acknowledgment information is sent after a preset time interval of the PPDU, and the preset time interval may be a SIFS. Optionally, the first acknowledgment information and the second acknowledgment information may be a block acknowledgment (BA) or an ACK. Optionally, duration of the first acknowledgment information is the same as duration of the second acknowledgment information.

In an implementation, the multi-link device that sends the first PPDU may be a multi-link station, and the destination receive end of the first PPDU may be an access point. In another implementation, the multi-link device that sends the first PPDU may be a multi-link access point, and the destination receive end of the first PPDU may be a station. To enable the destination receive end to know a role of the device that sends the first PPDU, optionally, the physical layer preamble of the first PPDU includes an uplink-downlink indication (which may also be represented as an uplink/downlink indication). The uplink-downlink indication is used to indicate a transmission direction of the first PPDU, and the transmission direction includes uplink or downlink. A PPDU sent by an AP in the multi-link device to a station is a downlink PPDU, and a PPDU sent by a station in the multi-link device to an AP is an uplink PPDU. It should be noted that, if a transmit end of the first PPDU is a multi-link AP, when the multi-link AP first sends the first PPDU over the first link, another multi-link station in a current BSS cannot perform channel contention over another link (for example, the second link), and cannot send a PPDU to the multi-link AP over the second link, to avoid simultaneous transmission and reception on the multi-link AP side. If the transmit end is a multi-link station, when the multi-link station first sends the first PPDU over the first link, another multi-link station in a current BSS can perform channel contention over another link (for example, the second link), and then send the second PPDU to an access point in the current BSS. The sending time of the second PPDU is equal to or later than the sending time of the first PPDU, but the end time of the second PPDU is not later than the end time of the first PPDU. In an implementation, the end time of the second PPDU is the same as the end time of the first PPDU. It can be understood that, certainly, in a case of downlink transmission, the first PPDU may alternatively be sent by an access point in the multi-link device, and the destination receive end of the first PPDU is a station; and in a case of uplink transmission, the first PPDU may alternatively be sent by a station in the multi-link device, and the destination receive end of the first PPDU is an access point.

Figure 4:
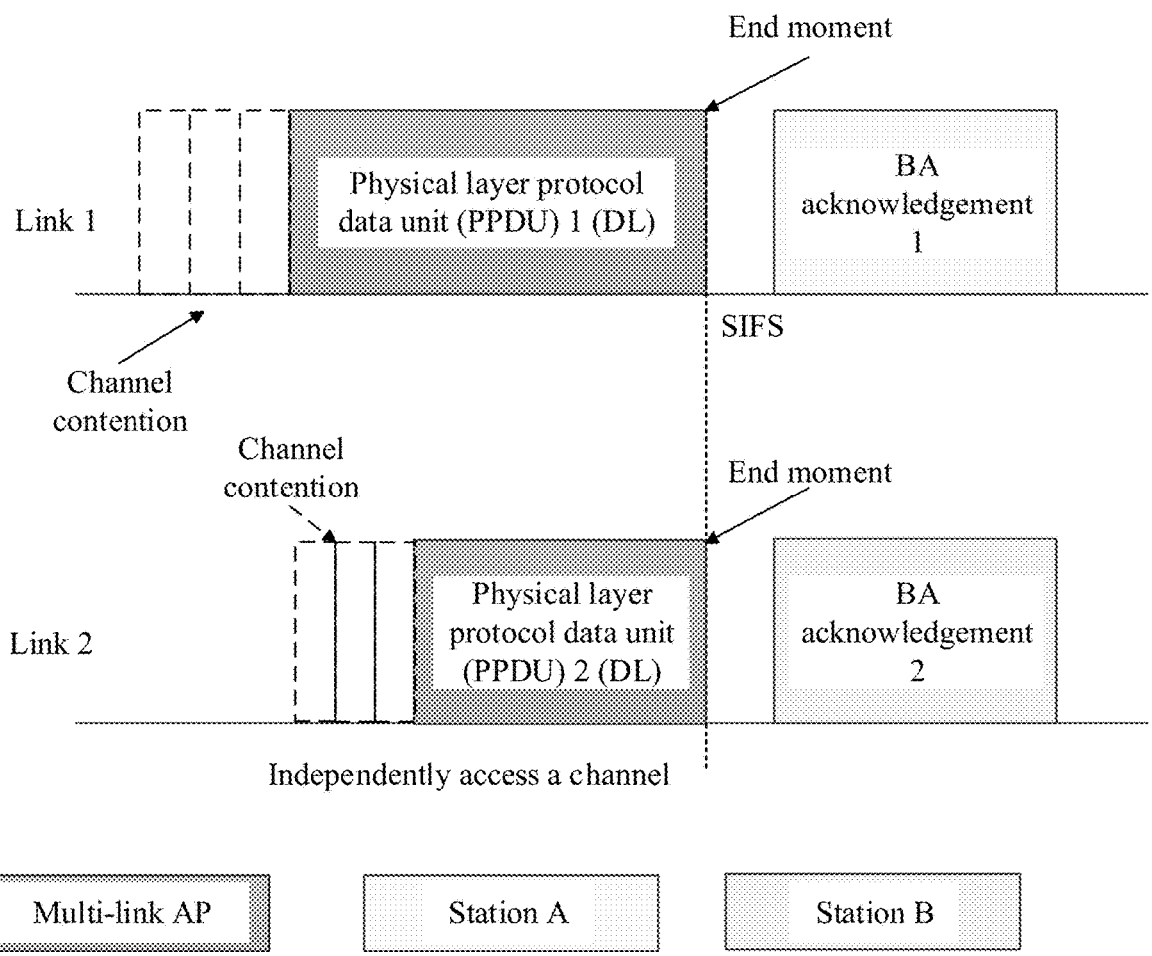
FIG. 4 is a schematic diagram 1 of a time sequence of a multi-link communication method according to an embodiment of this disclosure.

For example, FIG. 4 shows a case of downlink transmission. A multi-link AP sends a PPDU 1 to a station A over a link 1 through channel contention, and then preempts a channel over a link 2 through contention to send a PPDU 2 to a station B. A start time of the PPDU 2 is not earlier than (is equal to or later than) a start time of the PPDU 1. FIG. 4 shows a case in which an end time of the PPDU 2 is equal to an end time of the PPDU 1. In this case, the end time of the PPDU 2 is aligned with the end time of the PPDU 1. The station A and the station B return acknowledgment information, for example, BAs, on channels over the link 1 and the link 2, respectively. This embodiment may be further extended to a case in which the AP sends multi-user data packets, for example, 802.11ax HE MU PPDUs, to a plurality of stations over the link 1 and the link 2. The multi-user data packets may be sent in an OFDMA manner, a MU-MIMO manner, or a hybrid manner of OFDMA and MU-MIMO.

Figure 5:
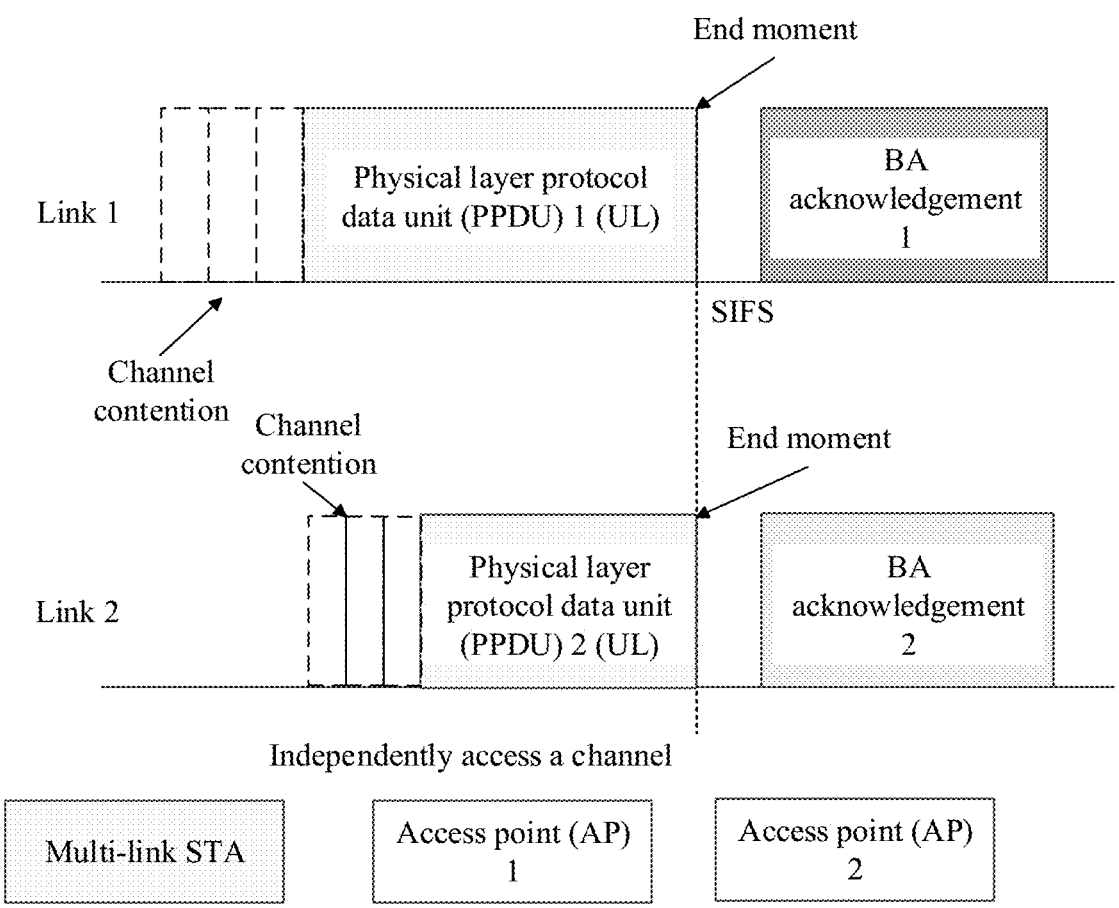
FIG. 5 is a schematic diagram 2 of a time sequence of another multi-link communication method according to an embodiment of this disclosure.

For example, FIG. 5 shows a case of uplink transmission. A multi-link STA sends a PPDU 1 to an access point (AP) 1 over a link 1, and then preempts a channel over a link 2 through contention to send a PPDU 2 to an access point (AP) 2. A start time of the PPDU 2 is not earlier than a start time of the PPDU 1. To be specific, the start time of the PPDU 2 is equal to or later than the start time of the PPDU 1. FIG. 5 shows a case in which the start time of the PPDU 2 is equal to the start time of the PPDU 1. In this case, an end time of the PPDU 2 is aligned with an end time of the PPDU 1. The AP 1 and the AP 2 return acknowledgment information on channels over the link 1 and the link 2, respectively. Certainly, in the scenario shown in FIG. 5, the AP 1 and the AP 2 may be access points that are in a same multi-link access point and that operate over different links, or may be access points in different multi-link devices, or the like.

For ease of description, the multi-link device in steps S101 and S102 is represented as a first multi-link device. Another multi-link station (a non-AP STA) that belongs to a same BSS as the first multi-link device may perform tunneled direct link setup (tunneled direct link setup, TDLS) transmission. For example, a station (a non-AP STA) in the another multi-link station may send another message packet to another station (a non-AP STA) within a transmission time in which the first multi-link device sends the first PPDU. Specific implementation methods are as follows:

First implementation method: If the first multi-link device is a multi-link AP, or in other words, the first PPDU is a downlink PPDU, when the multi-link AP first sends the first PPDU over the first link, another multi-link station in the current BSS may transmit a TDLS message packet over another link (the second link) through channel contention. A sending time of the TDLS message packet is equal to or later than the sending time of the first PPDU. When a receiving object of the TDLS message packet is a receiving object of the first PPDU, a manner that is mentioned in this embodiment and in which an end time of the TDLS message packet is not later than the end time of the first PPDU sent by the AP needs to used. To be specific, the end time of the TDLS message packet is earlier than the end time of the first PPDU or the end time of the TDLS message packet is the same as the end time of the first PPDU. For other cases, there may be no limitation.

Second implementation: If the first multi-link device is a multi-link station, or in other words, the first PPDU is an uplink PPDU, when the multi-link station first sends the first PPDU over the first link, another multi-link station in the current BSS may transmit a TDLS message packet over another link (the second link) through channel contention, but a receiving object of the TDLS message packet cannot be the first multi-link device that sends the first PPDU, that is, the multi-link station. For other cases, there is no limitation.

According to the solution in this embodiment of this disclosure, the multi-link device independently performs channel contention over the plurality of links; and a PPDU is sent earlier over a link over which a channel is preempted earlier through contention, and a PPDU is sent later over a link over which a channel is preempted later through contention. This not only can ensure fairness of multi-link access, but also can reduce an idle rate of the plurality of links and improve frequency efficiency.

Embodiment 2 provides another multi-link communication method. The method may be applied to a multi-link device, and the method includes the following steps.

S201. A first multi-link device sends a first physical layer protocol data unit (PPDU) over a first link.

For S201, refer to the description in step S101. Details are not described herein again. Optionally, the first multi-link device does not support simultaneous transmission and reception over the first link and a second link.

S202. After a preset time interval after a second device receives the first PPDU over the first link, the second device sends a second PPDU in response to the first PPDU.

Optionally, the preset time interval may be a SIFS.

S203. After the preset time interval, the first multi-link device receives, over the first link, the second PPDU in response to the first PPDU.

Correspondingly, a destination receiving party of the first PPDU is the second device. The second device receives the first PPDU, and after the preset time interval, sends, over the first link, the second PPDU in response to the first PPDU. The second device may be a device operating only over a single link (that is, the first link), or may support multi-link communication, and belong to a same BSS as the first multi-link device. The preset time interval is agreed on in a protocol, and may be a SIFS. The first PPDU may include a data frame, a management frame, or a control frame, or may include aggregated frames.

The first multi-link device may be a multi-link AP or a multi-link STA. In an implementation, if the first PPDU includes data information, the second PPDU includes acknowledgment information in response to the data information. If the first PPDU is a downlink PPDU, the first multi-link device is a multi-link AP. If the first PPDU is an uplink PPDU, the first multi-link device is a multi-link STA. In another implementation, if the first PPDU includes trigger information used to trigger the second device to send data information, the second PPDU includes data information solicited by the trigger information, and in this case, the first multi-link device is a multi-link AP. A physical layer preamble of the PPDU herein includes an uplink/downlink indication. For an explanation of the uplink/downlink indication, refer to the foregoing Embodiment 1, and details are not described herein again.

Optionally, S204. A third multi-link device obtains the first PPDU sent by the first multi-link device over the first link. A sequence between S203 and S204 is not limited. "Obtain" may be "receive" or "identify". Optionally, the third multi-link device may further obtain the second PPDU that is sent by the second device over the first link in response to the first PPDU. After obtaining the first PPDU or the second PPDU, the third multi-link device may determine an end time or transmission duration of the second PPDU based on information carried in the first PPDU and/or the second PPDU, to determine, based on the end time or the transmission duration of the second PPDU, transmission duration or an end time of a third PPDU to be sent. For details about a manner of obtaining the first PPDU or the second PPDU, refer to the following description.

S205. The third multi-link device sends the third PPDU over the second link, where the end time of the third PPDU is not later than the end time of the second PPDU.

Optionally, the third multi-link device may send the third PPDU through channel contention. Specifically, after identifying or receiving the first PPDU, at or after an end time of the first PPDU, the third multi-link device that belongs to a same basic service set as the first multi-link device may send the third PPDU over the second link through channel contention. A sending time of the third PPDU is later than or equal to the end time of the first PPDU, and the end time of the third PPDU is earlier than or equal to the end time of the second PPDU. In an optional implementation, the end time of the third PPDU is the same as the end time of the second PPDU, but the sending time of the third PPDU needs to be not earlier than the end time of the first PPDU sent by the first multi-link device, or in other words, the second device sends the third PPDU over the second link through channel contention at or after the end time of the first PPDU. This prevents the first multi-link device from simultaneously performing transmission and reception over the first link and the second link. In addition, a case in which a time at which the first multi-link device sends the first PPDU over the first link overlaps a time at which the first multi-link device receives the third PPDU over the second link (the first multi-link device simultaneously performs transmission and reception) needs to be avoided only when a third bandwidth of the third PPDU and a first bandwidth of the first PPDU need to satisfy a specific relationship. Otherwise, the solution in this embodiment of this disclosure may not need to be used. The foregoing relationship may be that the first bandwidth and the third bandwidth are greater than a bandwidth threshold, and a principle is that a frequency interval between the first PPDU of the first bandwidth and the third PPDU of the third bandwidth is less than a threshold.

Optionally, the third multi-link device may include a third-party multi-link station that is not a destination receive end of the first PPDU and a destination receive end of the first PPDU, that is, the second device. After identifying or receiving the first PPDU, the third multi-link device independently performs channel contention over another link (the second link), and sends the third PPDU after preempting a channel through contention. In an implementation, the third multi-link device in the current BSS starts to perform channel contention at or after the end time of the first PPDU, and starts to send the third PPDU after obtaining a channel sending right. In an example, a method for identifying or receiving the first PPDU includes identifying indication information in a preamble of the first PPDU, including but not limited to downlink/uplink indication information; and identifying indication information in a MAC header in the first PPDU, for example, a MAC address of a transmit end.

In this embodiment, a PPDU sent by a multi-link device may be a single-user message packet sent to a single station, or may be a multi-user message packet (including a message packet sent in an OFDMA manner, a MU-MIMO manner, or a hybrid manner of OFDMA and MU-MIMO) sent to a plurality of stations.

S206. Correspondingly, the first multi-link device receives, over the second link, the third PPDU sent by the third multi-link device over the second link, where the end time of the third PPDU is not later than the end time of the second PPDU. In an implementation, the end time of the third PPDU is equal to the end time of the second PPDU.

Because the end time of the third PPDU sent by the third multi-link device is not later than the end time of the second PPDU, the third multi-link device needs to obtain the end time or the transmission duration of the second PPDU. The third multi-link device may determine the end time of the third PPDU in the following several implementations.

First implementation: The first PPDU sent by the first multi-link device carries a length or time indication (or referred to as transmission duration information) used to indicate the transmission duration of the second PPDU; and the third multi-link device may determine the transmission duration of the second PPDU based on the transmission duration information in the first PPDU, to determine the transmission duration and/or the end time of the third PPDU based on the transmission duration of the second PPDU.

Second implementation: A physical layer preamble of the second PPDU sent by the second device includes transmission duration information, and the transmission duration information is used to indicate transmission duration of the second PPDU. For example, the transmission duration information is a length field in an L-SIG field in a legacy preamble. The third multi-link device may determine the transmission duration of the second PPDU based on the transmission duration information included in the physical layer preamble of the second PPDU, to determine the transmission duration and/or the end time of the third PPDU based on the transmission duration of the second PPDU.

Optionally, the transmission duration information carried in the first PPDU sent by the first multi-link device may also be used to indicate that the second PPDU starts to be sent only after a fixed interval, for example, a SIFS time, after the end time of the first PPDU.

It should be noted that, if the third multi-link device is a destination receive end of the first PPDU, that is, the second device, the second device learns of the duration of the second PPDU sent by the second device. Therefore, the transmission duration and/or the end time of the third PPDU may not be determined in the foregoing first implementation and second implementation. In this case, the second device is a multi-link device. If the third multi-link device is a multi-link device other than the first multi-link device and the second device, the transmission duration and/or the end time of the third PPDU may be determined in the foregoing first implementation and second implementation. In this case, alternatively, the second device may be a device operating only over a single link (that is, the first link), or may be a device that supports a multi-link operation.

For example, when the first PPDU sent by the first multi-link device includes a data frame or a management frame, the second PPDU returned by the second device includes acknowledgment information. Because a transmission time of the acknowledgment information is relatively short, transmission duration obtained by another multi-link device in the current BSS over another link in the foregoing manners is also relatively short. The another multi-link device includes a device in the current BSS other than the first multi-link device, for example, the third multi-link device. To enable another multi-link station in the current BSS to learn of the transmission duration of the acknowledgment information, a MAC header of a message packet sent by a multi-link AP may carry transmission duration information of the acknowledgment information. In an example, the transmission duration information may be a length field in a unit of byte, and a function of the transmission duration information is similar to that of a length field in an L-SIG in a legacy preamble. For example, based on a length, the another multi-link station may determine that transmission time=length field/6 Mbps, to obtain the transmission duration of the third PPDU. Optionally, the length field may be carried in a length subfield included in a triggered response schedule (TRS) field in 802.11ax, and another subfield in the TRS field may be set to a special value or a reserved value. Certainly, because the transmission time of the acknowledgment information is relatively short, transmission opportunity duration that may be obtained by the another device is relatively short. In this case, transmission in the transmission time may be prohibited or may be allowed based on a stipulation in a protocol. In addition, the second PPDU returned by the second device may further include another frame in addition to the acknowledgment information. The first PPDU also needs to carry the transmission duration information. For example, length indication information is carried in a MAC header to indicate the transmission duration of the second PPDU.

For another example, when a first PPDU sent by a multi-link AP includes a trigger frame that carries trigger information, the first PPDU may further include another aggregated frame, where the trigger frame is used to schedule a plurality of users to perform uplink OFDMA transmission, MU-MIMO transmission, or hybrid OFDMA and MU-MIMO transmission. In this case, a second PPDU returned by the plurality of stations based on the trigger frame includes uplink data, for example, a data frame. In this case, transmission opportunity duration obtained by the multi-link station in a current BSS over another link in the foregoing manners is relatively long. In another example, trigger information included in a first PPDU may not be carried in a separate trigger frame, or trigger information may be carried in a MAC header of a MAC frame in the first PPDU. For example, the trigger information is carried in a TRS field of a PPDU that complies with the 802.11ax standard. Further, the trigger frame sent by the multi-link AP includes a length indication used to indicate a transmission time of the second PPDU, and the length indication may be in a unit of duration, or may be in a unit of byte. When the length indication is in a unit of byte, when calculating the transmission time of the second PPDU by using the length indication, a receive end obtains the transmission time by dividing a quantity of bytes carried in a length field by 6 Mbps instead of dividing the quantity of bytes by an actual rate of the second PPDU.

In addition, third TXOP duration in the third PPDU sent by the third multi-link device in the current BSS may be set based on first TXOP duration in the first PPDU or the transmission duration of the second PPDU.

Optionally, the third TXOP duration in the third PPDU may be set to a smaller time value or an earlier end time value in the following two types of duration:
1. the first TXOP duration in the first PPDU; and
2. the transmission duration of the second PPDU indicated by a length field of the first PPDU, or a sum of the transmission duration of the second PPDU indicated by the length field of the first PPDU, a SIFS, and transmission duration of acknowledgment information in response to the second PPDU.

Therefore, in an example, the third PPDU includes third TXOP duration information indicating third TXOP duration, and the third TXOP duration does not exceed a smaller time value or an earlier end time value of first TXOP duration indicated by first TXOP duration information in the first PPDU and second duration; and the second duration is the transmission duration of the second PPDU, or a sum of the transmission duration of the second PPDU, a SIFS, and transmission duration of acknowledgment information in response to the second PPDU. Optionally, the first TXOP duration information is carried in a physical layer preamble of the first PPDU or a duration field in a MAC header of the first PPDU, and the third TXOP duration information is carried in a physical layer preamble of the third PPDU or a duration field in a MAC header of the third PPDU. An earliest end time value refers to an earliest end time among end times of all duration. That the third TXOP duration does not exceed the earliest end time value means that an end time value of the third TXOP duration does not exceed the earliest end time value, and that the third TXOP duration does not exceed a smallest time value means that the third TXOP duration does not exceed shortest duration.

The following briefly describes the solution in this embodiment of this disclosure by using several examples.

Figure 6:
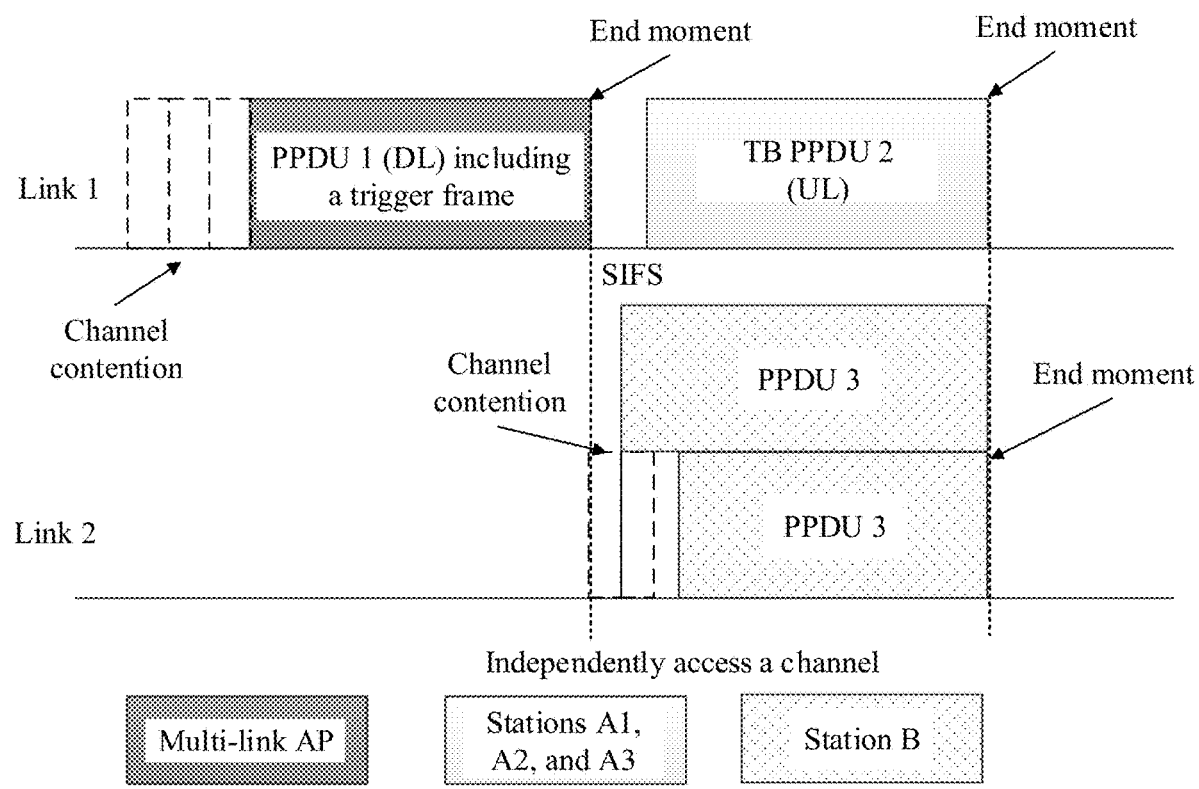
FIG. 6 is a schematic diagram 3 of a time sequence of still another multi-link communication method according to an embodiment of this disclosure.

For example, as shown in FIG. 6, after successfully contending for a channel over a link 1, a multi-link AP sends a PPDU 1 including a trigger frame, and schedules stations A1, A2, and A3 to send an uplink multi-user data packet (PPDU 2). A length field in the trigger frame indicates transmission duration of the uplink multi-user data packet (PPDU 2). After receiving the PPDU 1 sent by the multi-link AP 1 over the link 1, a third-party multi-link station (STA) B in a current BSS starts to contend for a channel over a link 2 at an end time of the PPDU 1, and then sends a PPDU 3. FIG. 6 shows two possible times at which the STA B sends the PPDU 3 over the link 2. A time at which the PPDU 3 is sent may be earlier or later than a time at which the stations A1, A2, and A3 starts to send the uplink multi-user data packet (PPDU 2). Certainly, the time at which the PPDU 3 is sent may alternatively be equal to the start time (not shown in FIG. 6). Certainly, whether the time at which the PPDU 3 is sent is earlier than, later than, or equal to the time at which the stations A1, A2, and A3 starts to send the uplink multi-user data packet (PPDU 2) depends on a time at which the STA B preempts the channel over the link 2. In addition, an end time of the PPDU 3 sent by the STA B over the link 2 is the same as an end time of the uplink multi-user data packet sent by the scheduled stations A1, A2, and A3. The stations A1, A2, and A3 may not be multi-link stations, and the station B is a multi-link station. Certainly, when the stations A1, A2, and A3 are also multi-link stations, the stations A1, A2, and A3 each may also perform channel contention over the link 2, to send a PPDU 3.

Figure 7:
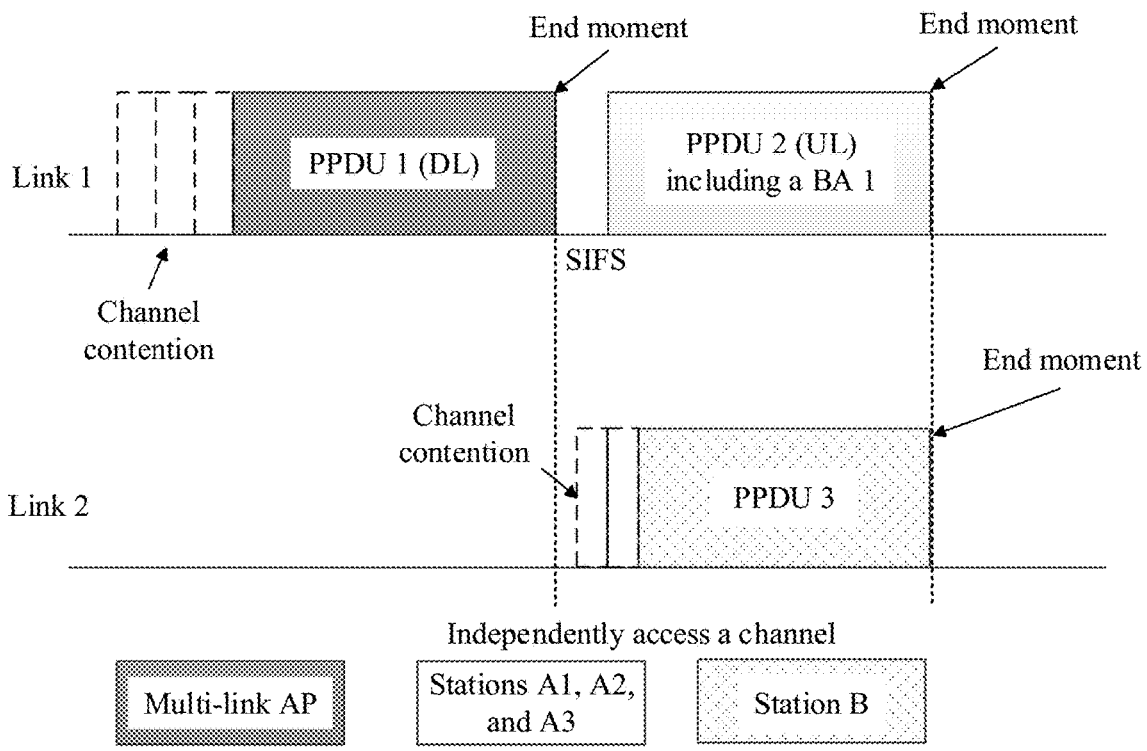
FIG. 7 is a schematic diagram 4 of a time sequence of still another multi-link communication method according to an embodiment of this disclosure.

For example, as shown in FIG. 7, after successfully contending for a channel over a link 1, a multi-link AP sends a PPDU 1 including downlink data, and receive ends of the downlink data are stations A1, A2, and A3. After a SIFS time, the stations A1, A2, and A3 send a PPDU 2 including acknowledgment information. After receiving the PPDU 1 sent by the multi-link AP 1 over the link 1, a third-party multi-link station (STA) B in a current BSS starts to contend for a channel over a link 2 at an end time of the PPDU 1, and then sends a PPDU 3. The stations A1, A2, and A3 may not be multi-link stations, and the station B is a multi-link station. Certainly, when the stations A1, A2, and A3 are also multi-link stations, the stations A1, A2, and A3 each may also perform channel contention over the link 2, to send a PPDU 3.

Figure 8:
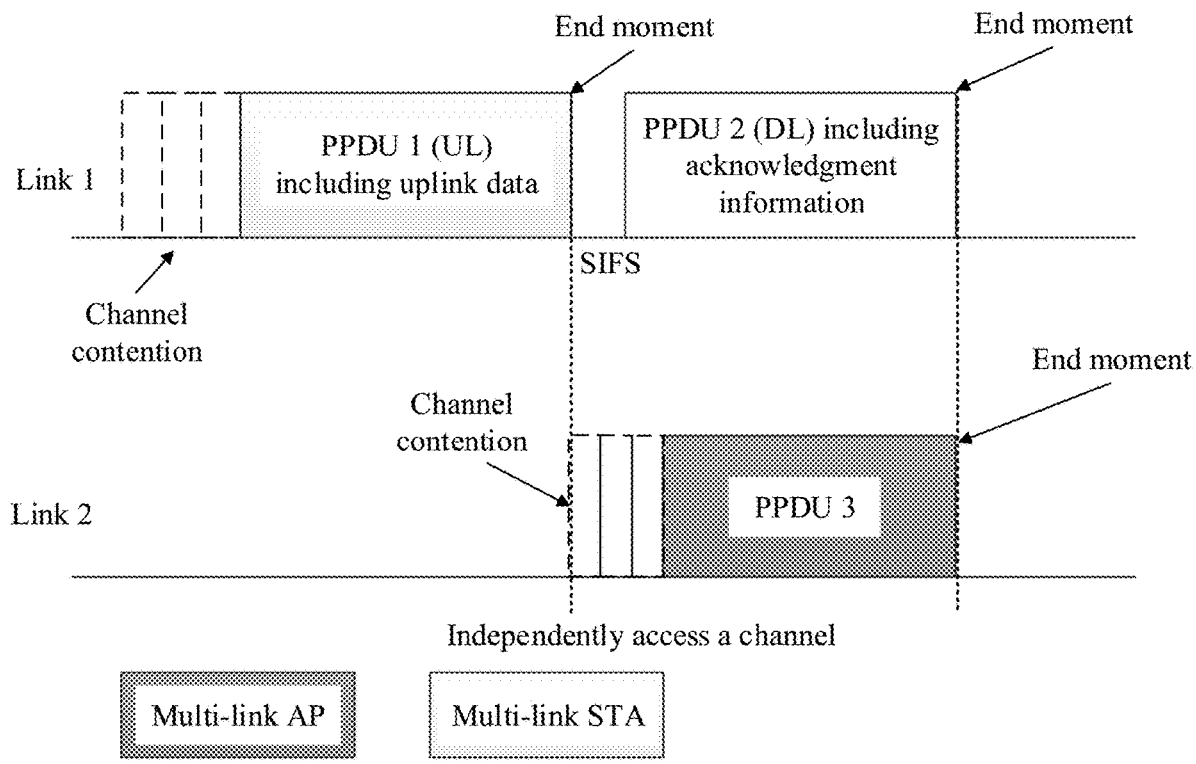
FIG. 8 is a schematic diagram 5 of a time sequence of still another multi-link communication method according to an embodiment of this disclosure.

For example, as shown in FIG. 8, after successfully contending for a channel over a link 1, a multi-link STA sends a PPDU 1 including uplink data, and a receive end of the uplink data is an AP. After a SIFS time, the AP sends a PPDU 2 including acknowledgment information. Certainly, the PPDU 2 may further include another frame. In addition, at an end time of the PPDU 1 sent by the STA A, the AP starts to perform channel contention over a link 2. After preempting a channel, the AP sends a PPDU 3 to the station A or another station over the link 2. A manner of determining an end time of the PPDU 3 is consistent with corresponding content in the method mentioned above, and details are not described again.

In this scenario in Embodiment 2, another multi-link station (different from the first multi-link device and the second device) that belongs to a same BSS as the first multi-link device may perform tunneled direct link setup (TDLS) transmission. For example, a station (a non-AP STA) in the another multi-link station may send another message packet to another station (a non-AP STA) over the second link through channel contention within the transmission time in which the second device sends the second PPDU. Specific implementation methods are as follows:

First implementation method: If the first multi-link device is a multi-link AP, and the second device is a multi-link station, when the multi-link AP first sends the first PPDU over the first link, or in other words, the first PPDU is a downlink PPDU, the another multi-link station in the current BSS may transmit a TDLS message packet over another link (the second link) through channel contention after the end time of the first PPDU, but a receiving object of the TDLS message packet cannot be a receive end of the first PPDU, that is, the second device. For other cases, there is no limitation.

Second implementation: If the first multi-link device is a multi-link station, when the multi-link station first sends the first PPDU over the first link, another multi-link station in the current BSS may transmit a TDLS message packet over another link (the second link) through channel contention. When a receiving object of the TDLS message packet is the first multi-link device, a manner that is mentioned in this embodiment and in which an end time of the TDLS message packet is earlier than or equal to the end time of the second PPDU sent by the second device needs to be used. For other cases, there is no limitation.

According to the solution in this embodiment of this disclosure, in a scenario in which simultaneous transmission and reception over a plurality of links is not supported, when receiving the PPDU sent by the first multi-link device over the first link, a multi-link device may start to perform channel preemption (including actions such as listening and backoff) over another link at the end time of the PPDU, to send a PPDU. This not only can ensure fairness of multi-link access, but also can reduce an idle rate of the plurality of links and improve frequency efficiency.

It should be noted that, the solutions in Embodiment 1 and Embodiment 2 of this disclosure not only can be applied to a scenario in which the multi-link device does not support simultaneous transmission and reception over the first link and the second link, but also can be applied to a scenario in which the multi-link device supports simultaneous transmission and reception over the first link and the second link.

Embodiment 3

In a case in which simultaneous transmission and reception over a plurality of links is not supported, a multi-link device first sends a message packet over one link. Because energy of the message packet is leaked to another link, a clear channel assessment (CCA) detection result of a channel over the another link is still "busy" even if the channel is idle. In this embodiment of this disclosure, the multi-link device may test, in advance through calibration when the plurality of links are idle, power that is in different power data packets and that is leaked to another link. For example, it is detected that self-interference caused by leakage is X dB. Therefore, in the case in which simultaneous transmission and reception over the plurality of links is not supported, the multi-link device first sends a message packet over one link, and performs CCA over another link to detect whether a channel over the link is idle or busy. In this case, a detection threshold for performing CCA detection on the another link needs to be reduced by (X−C) dB. C is a fixed safety value and is specified according to a protocol, and may be 0 or another value. The detection threshold reduction manner may be applied to energy detection and signal detection. For example, when signal detection is used, a signal detection threshold of a primary 20 MHz channel is usually −82 dBm. In other words, if energy detected through CCA is greater than or equal to −82 dBm, it indicates that the channel is busy, or otherwise, the channel is idle. In a scenario in which a multi-link station sends a data packet over one link, a detection threshold for CCA detection on a channel over another link may be (−82+X1±C1) dBm. C1 is an estimated safety value, may be agreed on according to a protocol, and may be 0 or another value. X1 is self-interference caused by leakage. When power detected through CCA is greater than or equal to (−82+X1±C1) dBm, it is determined that the channel is busy, or otherwise, it is determined that the channel is idle. For example, when energy detection is used, an energy detection threshold of a primary 20 MHz channel is usually −62 dBm, (−62+X2—C2). C2 is an estimated safety value, may be agreed on according to a protocol, and may be 0 or another value. X2 is self-interference caused by leakage. When power detected through CCA is greater than or equal to (−62+X1±C1) dBm, it is determined that the channel is busy, or otherwise, it is determined that the channel is idle. Optionally, X1 and X2 may be the same or different, and C1 and C2 may be the same or different.

According to the detection method in this embodiment of this disclosure, accuracy of CCA detection can be improved, so that the multi-link device can more accurately determine an idle or busy state of a channel. It should be noted that, the method for setting a detection threshold provided in Embodiment 3 is not limited to being applied to the solution in any one of the foregoing embodiments, but can also be applied to another scenario of multi-link communication.

The foregoing describes in detail the method in the embodiment of this disclosure, and the following provides an apparatus in the embodiment of this disclosure.

Figure 9:
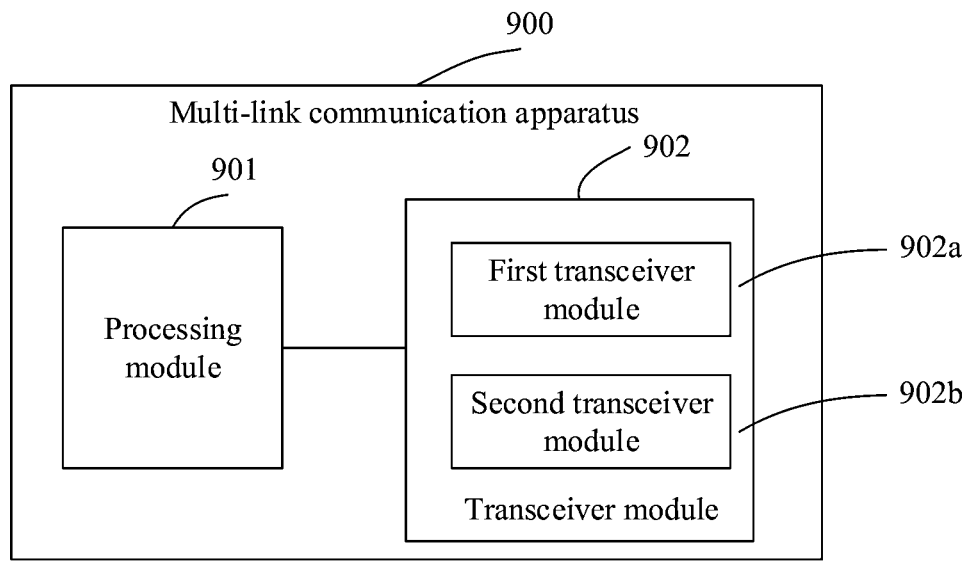
FIG. 9 is a schematic diagram 1 of a structure of a multi-link communication apparatus according to an embodiment of this disclosure.

FIG. 9 is a schematic diagram of a structure of a multi-link communication apparatus according to an embodiment of this disclosure. The multi-link communication apparatus may be configured to implement any method and function related to the multi-link communication apparatus in any one of the foregoing embodiments. The multi-link communication apparatus 900 may include a transceiver module 902. The transceiver module 902 includes a first transceiver module 902*a* and a second transceiver module 902*b*. Optionally, the multi-link communication apparatus includes a processing module 901. In an optional design, one transceiver module may correspond to one station in a multi-link device, and may include one baseband circuit and one radio frequency circuit. In another possible design, one transceiver module may include one radio frequency circuit, and a plurality of radio frequency circuits are coupled to one baseband circuit. Therefore, the baseband circuit may be included in the processing module. It should be noted that a quantity of modules in the communication apparatus 900 is merely used as an example.

In an optional design, the multi-link communication apparatus 900 can implement any method and function of the multi-link device in Embodiment 1. For example, the processing module 901 is configured to generate a first PPDU and a second PPDU. Optionally, the processing module may include a first processing module and a second processing module. The first processing module is configured to generate the first PPDU, and the second processing module is configured to generate the second PPDU. The first transceiver module 902*a* is configured to send the first PPDU over a first link, for example, configured to implement step S101. The second transceiver module 902*b* is configured to send the second PPDU over a second link through channel contention, for example, configured to implement step S102. An end time of the second PPDU is not later than an end time of the first PPDU. Optionally, the first transceiver module 902*a* is further configured to receive first acknowledgment information over the first link, and the second transceiver module 902*b* is further configured to receive second acknowledgment information over the second link.

In another possible design, the multi-link communication apparatus 900 can implement any method and function of the first multi-link device in Embodiment 2. For example, the processing module 901 is configured to generate a first PPDU. The first transceiver module 902*a* is configured to send the first PPDU over a first link, for example, configured to implement step S201. The first transceiver module 902*a* is further configured to receive, over the first link, a second PPDU in response to the first PPDU, for example, configured to implement step S203. The second transceiver module 902*b* is configured to receive, over a second link, a third PPDU sent by a third multi-link device over the second link, for example, configured to implement step S206. An end time of the third PPDU is not later than an end time of the second PPDU.

In still another possible design, the multi-link communication apparatus 900 can implement any method and function of the third multi-link device in Embodiment 2. For example, the processing module 901 is configured to generate a third PPDU. The first transceiver module 902*a* is configured to obtain or receive a first PPDU over a first link, for example, configured to implement step S204. The second transceiver module 902*b* is configured to send a third PPDU over a second link, for example, configured to implement step S205. An end time of the third PPDU is not later than an end time of a second PPDU.

In still another possible design, the multi-link communication apparatus can implement CCA detection in Embodiment 3. For example, the transceiver module is configured to perform CCA detection; and the processing module is configured to determine an idle or busy state of a channel based on a detection result of the transceiver module. The processing module is configured to: when power detected by the transceiver module on a channel over a second link is greater than or equal to (−82+X1±C1) dBm, determine that the channel over the second link is busy; and the processing module is configured to: when power detected by the transceiver module on a channel over the second link is less than (−82+X1±C1) dBm, determine that the channel over the second link is idle.

Figure 10:
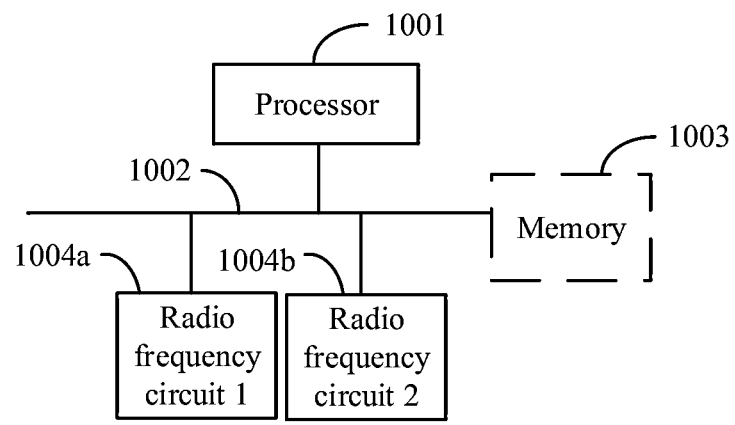
FIG. 10 is a schematic diagram 2 of a structure of another multi-link communication apparatus according to an embodiment of this disclosure.

FIG. 10 is a schematic diagram of a structure of a multi-link communication apparatus according to an embodiment of this disclosure. The multi-link communication apparatus may be configured to implement any method and function related to the multi-link communication apparatus in any one of the foregoing embodiments. The multi-link communication apparatus may include a processor 1001, a bus 1002, a radio frequency circuit 1004*a*, and a radio frequency circuit 1004*b*. Optionally, the multi-link communication apparatus further includes a memory 1003. In an optional design, one station in a multi-link device includes one independent radio frequency circuit and one independent baseband circuit, and may independently implement functions of performing transmission and reception over a link over which the station operates. In another possible design, if one station in a multi-link device includes one common baseband circuit part and one independent radio frequency circuit part, data sent by the station over a link over which the station operates may be generated by the common baseband circuit. In this case, the baseband circuit may be included in the processor 1001. The processor 1001 is configured to execute instructions to implement control and management, signaling or data processing, and the like of the multi-link communication apparatus. The bus 1002 is configured to be coupled to components, so that the components can complete data or information exchange. The memory 1003 may include a computer program or instructions, and the processor 1001 may run the instructions to implement functions in the foregoing method embodiments.

In an optional design, the multi-link communication apparatus can implement any method and function of the multi-link device in Embodiment 1. For example, the processor 1001 is configured to generate a first PPDU and a second PPDU. Optionally, the processor may alternatively be a baseband circuit, and is configured to generate the first PPDU and the second PPDU. The radio frequency circuit 1004*a* is configured to send the first PPDU over a first link, for example, configured to implement step S101. The radio frequency circuit 1004*b* is configured to send the second PPDU over a second link through channel contention, for example, configured to implement step S102. An end time of the second PPDU is not later than an end time of the first PPDU. Optionally, the radio frequency circuit 1004*a* is further configured to receive first acknowledgment information over the first link, and the radio frequency circuit 1004*b* is further configured to receive second acknowledgment information over the second link.

In another possible design, the multi-link communication apparatus can implement any method and function of the first multi-link device in Embodiment 2. For example, the processor 1001 is configured to generate a first PPDU. The radio frequency circuit 1004*a* is configured to send the first PPDU over a first link, for example, configured to implement step S201. The radio frequency circuit 1004*a* is further configured to receive, over the first link, a second PPDU in response to the first PPDU, for example, configured to implement step S203. The radio frequency circuit 1004*b* is configured to receive, over a second link, a third PPDU sent by a third multi-link device over the second link, for example, configured to implement step S206. An end time of the third PPDU is not later than an end time of the second PPDU.

In still another possible design, the multi-link communication apparatus can implement any method and function of the third multi-link device in Embodiment 2. For example, the processor 1001 is configured to generate a third PPDU. The radio frequency circuit 1004*a* is configured to obtain or receive a first PPDU over a first link, for example, configured to implement step S204. The radio frequency circuit 1004*b* is configured to send the third PPDU over a second link, for example, configured to implement step S205. An end time of the third PPDU is not later than an end time of a second PPDU. Optionally, the processor 1001 may be further configured to obtain transmission duration of the second PPDU based on transmission duration information carried in the first PPDU and/or the second PPDU, to determine transmission duration or the end time of the third PPDU.

In still another possible design, the multi-link communication apparatus can implement CCA detection in Embodiment 3. For example, the radio frequency circuit is configured to perform CCA detection; and the processor 1001 is configured to determine an idle or busy state of a channel based on a detection result of the radio frequency circuit. The processor 1001 is configured to: when power detected by the radio frequency circuit 1004*b* on a channel over a second link is greater than or equal to $(-82+X1\pm C1)$ dBm, determine that the channel over the second link is busy; and the processor 1001 is configured to: when power detected by the radio frequency circuit 1004*b* on a channel over the second link is less than $(-82+X1\pm C1)$ dBm, determine that the channel over the second link is idle.

Figure 11:
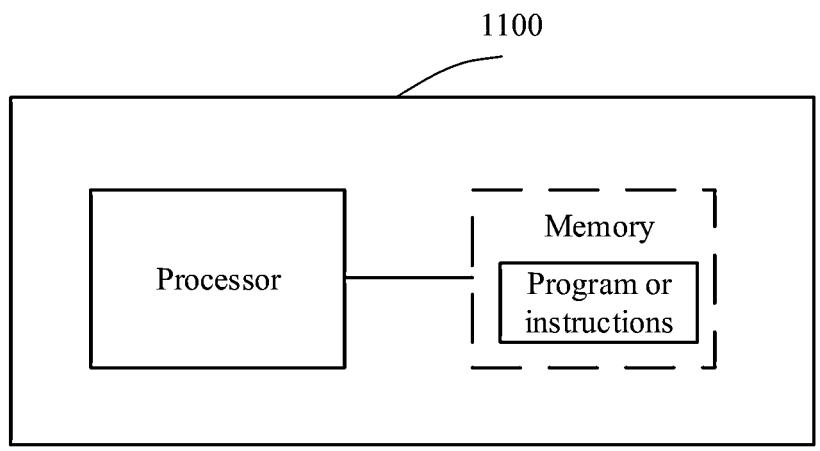
FIG. 11 is a schematic diagram 3 of a structure of still another multi-link communication apparatus according to an embodiment of this disclosure.

FIG. 11 is a schematic diagram of a structure of a multi-link communication apparatus according to an embodiment of this disclosure. The multi-link communication apparatus may be configured to implement any method and function related to the multi-link communication apparatus in any one of the foregoing embodiments. The multi-link communication apparatus 1100 may be a chip system, configured to support a multi-link device in implementing the function implemented in any one of the foregoing embodiments. The chip system may include a processor, and optionally further includes a memory, configured to store a program or instructions.

In an optional design, the processor is configured to execute the program or instructions, so that the multi-link communication apparatus implements any method and function in Embodiment 1. In another possible design, the processor is configured to execute the program or instructions, so that the multi-link communication apparatus implements any method and function in Embodiment 2. In still another possible design, the processor is configured to execute the program or instructions, so that the multi-link communication apparatus implements any method and function in Embodiment 3.

It should be noted that the memory may be included in the processor, or may be a storage unit that is located outside the processor and that is coupled to the processor.

An embodiment of this disclosure further provides a processor, configured to be coupled to a memory, and configured to perform any method and function related to the first multi-link device or the third multi-link device in any one of the foregoing embodiments.

An embodiment of this disclosure further provides a computer program product including instructions. When the computer program product is run on a computer, the computer is enabled to perform any method and function related to the first multi-link device or the third multi-link device in any one of the foregoing embodiments.

An embodiment of this disclosure further provides an apparatus, configured to perform any method and function related to the first multi-link device or the third multi-link device in any one of the foregoing embodiments.

An embodiment of this disclosure further provides a wireless communication system. The system includes at least one first multi-link device and one third multi-link device in any one of the foregoing embodiments.

All or a part of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, all or a part of the procedures or the functions according to the embodiments of this disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like.

What is claimed is:

1. A multi-link communication method, comprising:
sending, by a first multi-link device, a first physical layer protocol data unit (PPDU) to a second multi-link device over a first link;
sending, by the first multi-link device, a second PPDU to the second multi-link device over a second link, wherein the first PPDU and the second PPDU are sent simultaneously, the first PPDU includes a trigger frame, and an end time of the second PPDU is earlier than an end time of the first PPDU including the trigger frame;
receiving, by the first multi-link device over the first link, first information from the second multi-link device in response to the first PPDU;
receiving, by the first multi-link device over the second link, second information from the second multi-link device in response to the second PPDU; and,
wherein a duration time of the first information is the same as a duration time of the second information.

2. The method according to claim 1, wherein the second multi-link device does not support simultaneous transmission and reception.

3. The method according to claim 1, wherein a sending time of the second PPDU is not earlier than a sending time of the first PPDU.

4. The method according to claim 1, wherein at least one of the first PPDU or the second PPDU is a multi-user PPDU.

5. The method according to claim 1, wherein an interval between a time at which the first information is sent and a time at which the first PPDU is received is a preset time interval, and an interval between a time at which the second information is sent and a time at which the second PPDU is received is the preset time interval.

6. The method according to claim 1, wherein the first PPDU comprises an uplink-downlink indication, the uplink-downlink indication is used to indicate a transmission direction of the first PPDU, and the transmission direction comprises uplink or downlink.

7. The method according to claim 1, wherein the first PPDU comprises first TXOP duration information, and the first TXOP duration information indicates first TXOP duration; the second PPDU comprises second TXOP duration information, and the second TXOP duration information indicates second TXOP duration; and the first TXOP duration is the same as the second TXOP duration.

8. The method according to claim 1, wherein the first multi-link device is a multi-link AP, and the second multi-link device is a multi-link STA.

9. A multi-link device, comprising:
at least one processor; and
a memory one or more memories coupled to the at least one processor and storing instructions for execution by the at least one processor to:
send a first physical layer protocol data unit (PPDU) to a second multi-link device over a first link;
send a second PPDU to the second multi-link device over a second link, wherein the first PPDU and the second PPDU are sent simultaneously, the first PPDU includes a trigger frame and an end time of the second PPDU is earlier than an end time of the first PPDU including the trigger frame;
receive, over the first link, first information from the second multi-link device in response to the first PPDU;
receive, over the second link, second information from the second multi-link device in response to the second PPDU; and
wherein a duration time of the first information is the same as a duration time of the second information.

10. The multi-link device according to claim 9, wherein the second multi-link device does not support simultaneous transmission and reception.

11. The multi-link device according to claim 9, wherein a sending time of the second PPDU is not earlier than a sending time of the first PPDU.

12. The multi-link device according to claim 9, wherein at least one of the first PPDU or the second PPDU is a multi-user PPDU.

13. The multi-link device according to claim 9, wherein an interval between a time at which the first information is sent and a time at which the first PPDU is received is a preset time interval, and an interval between a time at which the second information is sent and a time at which the second PPDU is received is the preset time interval.

14. The multi-link device according to claim 9, wherein the first PPDU comprises an uplink-downlink indication, the uplink-downlink indication is used to indicate a transmission direction of the first PPDU, and the transmission direction comprises uplink or downlink.

15. The multi-link device according to claim 9, wherein the first PPDU comprises first TXOP duration information, and the first TXOP duration information indicates first TXOP duration; the second PPDU comprises second TXOP duration information, and the second TXOP duration information indicates second TXOP duration; and the first TXOP duration is the same as the second TXOP duration.

16. The multi-link device according to claim 9, wherein the multi-link device is a multi-link AP, and the second multi-link device is a multi-link STA.

17. A chip system, comprising:
a processor and an input/output interface, wherein the processor is configured to:
send a first physical layer protocol data unit (PPDU) to a second multi-link device over a first link;
send a second PPDU to the second multi-link device over a second link, wherein the first PPDU and the second PPDU are sent simultaneously, the first PPDU includes a trigger frame and an end time of the second PPDU is earlier than an end time of the first PPDU including the trigger frame;
receive, over the first link, first information from the second multi-link device in response to the first PPDU;
receive, over the second link, second information from the second multi-link device in response to the second PPDU; and,
wherein a duration time of the first information is the same as a duration time of the second information.

18. The chip system according to claim 17, wherein the second multi-link device does not support simultaneous transmission and reception.

19. The chip system according to claim 17, wherein a sending time of the second PPDU is not earlier than a sending time of the first PPDU.

20. The chip system according to claim 17, wherein at least one of the first PPDU or the second PPDU is a multi-user PPDU.

21. The chip system according to claim 17, wherein an interval between a time at which the first information is sent and a time at which the first PPDU is received is a preset time interval, and an interval between a time at which the second information is sent and a time at which the second PPDU is received is the preset time interval.

22. The chip system according to claim 17, wherein the first PPDU comprises an uplink-downlink indication, the uplink-downlink indication is used to indicate a transmission direction of the first PPDU, and the transmission direction comprises uplink or downlink.

23. The chip system according to claim 17, wherein the first PPDU comprises first TXOP duration information, and the first TXOP duration information indicates first TXOP duration; the second PPDU comprises second TXOP duration information, and the second TXOP duration information indicates second TXOP duration; and the first TXOP duration is the same as the second TXOP duration.

24. The chip system according to claim 17, wherein the chip system is applied for a multi-link AP, and the second multi-link device is a multi-link STA.

* * * * *